United States Patent
Inbe et al.

(10) Patent No.: US 6,659,171 B2
(45) Date of Patent: Dec. 9, 2003

(54) HYDROPHILIC MODIFICATION METHOD AND HEAT EXCHANGER TREATED THEREBY

(75) Inventors: Toshio Inbe, Yokohama (JP); Susumu Maekawa, Yokohama (JP); Akira Ushio, Hatogaya (JP); Koichi Saito, Tokyo (JP); Norizumi Matsui, Kamakura (JP); Osamu Kasebe, Kariya (JP); Kengo Kobayashi, Kariya (JP); Hiroyoshi Sugawara, Kariya (JP); Kazuhisa Uchiyama, Kariya (JP)

(73) Assignees: Nippon Paint Co., Ltd., Osaka (JP); Denso Corporation, Aichi (JP)

( * ) Notice: Subject to any disclaimer, the term of this patent is extended or adjusted under 35 U.S.C. 154(b) by 63 days.

(21) Appl. No.: 10/105,421

(22) Filed: Mar. 26, 2002

(65) Prior Publication Data

US 2003/0037914 A1 Feb. 27, 2003

(30) Foreign Application Priority Data

Mar. 27, 2001 (JP) .......................................... 2001-091050

(51) Int. Cl.$^7$ ............................. F28F 13/18; B05D 3/02; C08F 116/06
(52) U.S. Cl. .................... 165/133; 165/134.1; 427/409; 427/388.2; 525/56
(58) Field of Search ............................. 165/133, 134.1, 165/905; 427/409, 388.2; 525/155, 56, 62

(56) References Cited

U.S. PATENT DOCUMENTS

| | | | | |
|---|---|---|---|---|
| 4,783,224 A | * | 11/1988 | Sako et al. | ............... 427/388.2 |
| 4,954,372 A | * | 9/1990 | Sako et al. | ............... 427/388.2 |
| 4,957,159 A | * | 9/1990 | Mizoguchi et al. | ......... 165/133 |
| 5,280,054 A | * | 1/1994 | Sakai et al. | .................. 523/521 |
| 5,813,452 A | * | 9/1998 | Haruta et al. | ................ 165/133 |
| 6,245,854 B1 | * | 6/2001 | Obioha et al. | .............. 165/133 |

FOREIGN PATENT DOCUMENTS

| | | | |
|---|---|---|---|
| EP | 0 978 538 A1 | | 2/2000 |
| JP | 359185779 A | * | 10/1984 |
| JP | 403047570 A | * | 2/1991 |
| JP | 262968 | | 9/2000 |

* cited by examiner

Primary Examiner—Henry Bennett
Assistant Examiner—Tho V Duong
(74) Attorney, Agent, or Firm—Sughrue Mion, PLLC

(57) ABSTRACT

A hydrophilic modification method comprising a step of forming a coat having a solid coat amount of 0.02 to 3 g/m$^2$ on a heat exchanger with a modifier for hydrophilicity after treatment for rust prevention thereof wherein said modifier for hydrophilicity comprises a modified polyvinyl alcohol (A) having, on a side chain thereof, a group represented by the formula (I):

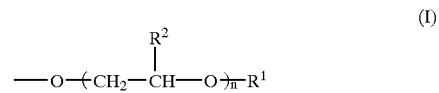

in the formula, n represents an integer of 1 to 500, R$^1$ represents a hydrogen atom or an alkyl group containing 1 to 4 carbon atoms, and R$^2$ represents a hydrogen atom or a methyl group, and at least one member (B) selected from the group consisting of phosphorus compound salts and boron compound salts of Ca, Al, Mg, Fe and Zn, said group represented by the formula (I) accounting for 0.01 to 20 mole percent relative to hydroxyl and acetoxy groups contained in said modified polyvinyl alcohol.

16 Claims, No Drawings

HYDROPHILIC MODIFICATION METHOD AND HEAT EXCHANGER TREATED THEREBY

TECHNICAL FIELD

The present invention relates to a modifier for hydrophilicity and a hydrophilic modification method to be used for providing evaporators and heat exchangers with good and hydrophilicity and odor preventing ability even during a long period of use.

PRIOR ART

Evaporators and heat exchangers generally have a complicated structure, namely they have aluminum fins arranged therein at short intervals for heat exchange and further have aluminum tubes intricately arranged for feeding a cooling medium to these fins. Therefore, the discharge of water condensed upon cooling operation is facilitated by modifying the surface of aluminum fins hydrophilic. However, the above surface of aluminum fins which are modified hydrophilic or the like is exposed to severe conditions, namely to repeated heating and cooling and mixed adhesion of condensed water and dust and microorganisms in the atmosphere. Therefore, it is difficult for that surface to retain a hydrophilicity over a long period of time.

Japanese Kokai Publication Hei-05-302042 discloses modifiers for hydrophilicity comprising polyvinyl alcohol (PVA), polyvinylpyrrolidone (PVP), nylon, phenolic resin, etc. Japanese Kokai Publication Hei-05-202313, Japanese Kokai Publication Hei-05-214273, JP 2649297 and Japanese Kokai Publication Hei-10-30069 disclose modifiers for hydrophilicity comprising water-dispersible organic resins and silica or alumina. Furthermore, Japanese Kokai Publication Hei-09-087576 discloses compositions for hydrophilic modification comprising minute hydrophilic crosslinked acrylic polymer particles.

Japanese Kokai Publication Hei-07-323500, Japanese Kokai Publication Hei-09-14889 and Japanese Kokai Publication Hei-11-131254 disclose modifiers for hydrophilicity intended for retaining hydrophilicity by crosslinking such polar functional groups as sulfonic acid groups and acrylamide for insolubilization.

Japanese Kokai Publication 2000-262968 discloses a coat for aluminum fins which comprises PVA having a degree of saponification of not less than 90% and a metal salt and are intended for suppressing odor emanation and deterioration in hydrophilicity.

SUMMARY OF THE INVENTION

The present invention has for its object to provide a hydrophilic modification method of heat exchangers, which method is capable of suppressing not only the odor of the resulting hydrophilic coat itself but also the unpleasant odor emanation after exposure to odorants and retaining the hydrophilicity even during a long period of use. A further object is to provide a heat exchanger treated by said hydrophilic modification method.

The present inventors found that when heat exchangers, after treatment for rust prevention, are treated with a modifier for hydrophilicity comprising a modified polyvinyl alcohol having a specific amount, in side chains, of groups resulting from addition of 1 of 500 moles of ethylene oxide, the heat exchangers thus coated with a hydrophilic coat can suppress possible odor emanation from the aluminum or like material of the above heat exchangers and from the above hydrophilic coat itself even during a long period of use and, even after exposure to an odorant, such as tobacco, sweat or perfume, can suppress emanation of the unpleasant odor of such odorant and, furthermore, can retain a sufficient hydrophilicity. The present invention has been completed on the basis of such findings.

The present invention thus provides a hydrophilic modification method comprising a step of forming a coat having a solid coat amount of 0.02 to 3 g/m² on a heat exchanger with a modifier for hydrophilicity after treatment for rust prevention thereof wherein said modifier for hydrophilicity comprises a modified polyvinyl alcohol (A) having, on a side chain thereof, a group represented by the formula (I):

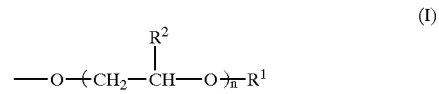

in the formula, n represents an integer of 1 to 500, $R^1$ represents a hydrogen atom or an alkyl group containing 1 to 4 carbon atoms, and $R^2$ represents a hydrogen atom or a methyl group, and at least one member (B) selected from the group consisting of phosphorus compound salts and boron compound salts of Ca, Al, Mg, Fe and Zn, said group represented by the formula (I) accounting for 0.01 to 20 mole percent relative to hydroxyl and acetoxy groups contained in the above modified polyvinyl alcohol.

The above modifier for hydrophilicity may further contain 0.1 to 30% by mass, relative to the above modifier for hydrophilicity, of a polyvinyl alcohol having a degree of saponification of not less than 90%.

The above-mentioned modified polyvinyl alcohol (A) preferably accounts for 0.1 to 30% by mass relative to the above modifier for hydrophilicity.

The above-mentioned at least one member (B) selected from the group consisting of phosphorus compound salts and boron compound salts of Ca, Al, Mg, Fe and Zn preferably accounts for 0.1 to 200% by mass relative to a resin solid matter.

The above heat exchanger is preferably made of an aluminum or aluminum alloy material.

The present invention is also directed to a heat exchanger treated by the above hydrophilic modification method.

DETAILED DESCRIPTION OF THE INVENTION

In the following, the present invention is described in detail.

The hydrophilic modification method of the invention comprises a step of forming a coat having a solid coat amount of 0.02 to 3 g/m² on a heat exchanger with a modifier for hydrophilicity after treatment for rust prevention thereof.

The above heat exchanger is not particularly restricted but is preferably made of an aluminum or aluminum alloy material.

Generally, the above heat exchanger is subjected in advance to degreasing treatment by cleaning with an acidic or alkaline cleaning agent.

The above acidic cleaning agent is not particularly restricted but includes, for example, acidic aqueous solutions such as those of nitric acid, sulfuric acid and hydrofluoric acid or a combination of these. The acid concentration of the above acidic cleaning agent is preferably 1 to 10 N, more preferably 3 to 6 N. It is also preferable to supplement the above acidic cleaning agent with a salt or acid salt of a metal selected from among iron, nickel, cobalt, molybdenum and cerium.

The above alkaline cleaning agent is not particularly restricted but includes, for example, alkaline aqueous solutions containing at least one of sodium hydroxide, sodium silicate and sodium phosphate. A surfactant may be added to the above alkaline aqueous solutions to thereby increase the detergency thereof.

The method of cleaning the above heat exchanger is not particularly restricted but may comprise, for example, spraying the heat exchanger with the above cleaning agent or immersing the heat exchanger in a bath containing the above cleaning agent. The liquid temperature of the above cleaning agent is preferably 10 to 70° C., and the time of contact with the above cleaning agent is preferably 1 second to 5 minutes. When the liquid temperature is below 10° C. or the above time of contact is shorter than 1 second, the etching may be insufficient and, a temperature exceeding 70° C. or a time exceeding 5 minutes may be unfavorable from the economical viewpoint. The heat exchanger cleaned in the above manner is washed with water and then subjected to treatment for rust prevention.

The above treatment for rust prevention is carried out in the manner of chemical conversion treatment using a chemical conversion agent. Usable as the above chemical conversion agent are the conventional chromatic chromating agent, phosphoric chromating agent and nonchromic treatment agent.

The above chromic chromating agent is an aqueous solution containing chromic acid, a fluoride and a strong acid, and includes a reactive chromate and electrolytic chromate whose main component is trivalent chromium, and a coating type chromate in which hexavalent and trivalent chromium are admixed. The above phosphoric chromating agent is a mixed aqueous solution containing chromic acid, orthophosphoric acid and a fluoride. In carrying out chemical conversion treatment with the above chromating agent, it is necessary to control the amounts of the hexavalent chromium ion, phosphate ion and fluoride ion, respectively.

The above nonchromic treatment agent includes a reactive treatment agent and a coating type treatment agent. The above reactive treatment agent includes zirconium salts, titanium salts, silicon salts, boron salts and permanganate salts. Also preferred are fluorides of these salts. The above coating type treatment agent includes, for example, coating type nonchromic treatment agents in which a zirconium salt is admixed with a water-soluble resin. Preferably, at least one member selected from the group consisting of manganese, vanadium, tungsten, molybdenum, titanium and aluminum and compounds containing these atoms, such as manganic acid, permanganic acid, vanadic acid, tungstic acid and molybdic acid, silica, phosphoric acid and phosphate salts is added to the above nonchromic treatment agent where necessary.

The method of chemical conversion treatment of the above heat exchanger is not particularly restricted but includes, for example, the dipping method and spraying method. Since the above heat exchanger generally has a complicated profile, the dipping method is preferred. In the above chemical conversion treatment, the treatment temperature is preferably at ordinary temperature or a slightly elevated temperature, more preferably at 10 to 70° C., and the treatment time is preferably 1 second to 5 minutes.

As the above-mentioned treatment for rust prevention, a resin primer of the epoxy, urethane or acrylic type may be applied on the substrate.

The chemical conversion coat obtained by the above chemical conversion treatment preferably has a solid coat amount of 10 to 300 mg/m$^2$, based on such elements as Cr, Zr or Ti adhered. When the amount is less than 10 mg/m$^2$, the rust prevention property may be insufficient. When the amount exceeds 300 mg/m$^2$, it is economically disadvantageous and, in addition, may lead to a decrease in hydrophilicity as a result of reaction with the hydrophilic coat. After the above chemical conversion treatment, the substrate is washed with water, if necessary, and then subjected to hydrophilic modification using the modifier for hydrophilicity.

The above modifier for hydrophilicity comprises a modified polyvinyl alcohol (A) having a group represented by the above formula (I) on a side chain(s) thereof. The above modified polyvinyl alcohol (A) has good hydrophilicity and water resistance, has itself no odor and hardly allows adsorption of odorants thereon, so that the above modifier for hydrophilicity which comprises the above-defined modified polyvinyl alcohol (A) is excellent in hydrophilicity and odor preventing ability. The hydrophilic coat obtained therefrom will hardly deteriorate even upon exposure to water drops or to running water and, therefore, the inorganic substances, such as silica, or other residual monomer components which are optionally contained and emanate their own dusty odor and/or the unpleasant odors of substances adsorbed thereon are hardly exposed and, further, the treated materials, such as aluminum, are hardly exposed, so that the treated materials themselves can be prevented from being scattered to emanate dusty odors or being corroded.

In the above formula (I), n is an integer of 1 to 500. When it exceeds 500, the hydrophilicity becomes excessive, making the film-forming ability poor and facilitating the adsorption of odorants. Preferably, n is an integer of 1 to 100, more preferably an integer of 1 to 30. $R^1$ in the above formula (I) represents a hydrogen atom or an alkyl group containing 1 to 4 carbon atoms. The above alkyl group containing 1 to 4 carbon atoms is not particularly restricted but may be methyl, ethyl, n-propyl, i-propyl, n-butyl, i-butyl or tert-butyl group. $R^2$ in the above formula (I) represents a hydrogen atom or a methyl group. The above $R^1$ and $R^2$ may be the same or different. Thus, for example, each may be a hydrogen atom to give an oxyethylene chain, or the above $R^1$ may be a hydrogen atom and the above $R^2$ may be a methyl group to form an oxy-1-methylethylene chain.

The above-mentioned modified polyvinyl alcohol (A) has hydroxyl groups and ester bonds as side chains in addition to the group represented by the above formula (I). The above ester bonds are not particularly restricted but may be alkyl ester bonds, for instance. The above ester bonds are generally of the acetate type, namely acetoxy groups are bound, as side chains, to the main chain. The above hydroxyl groups are generally free ones and may form a salt with a metal such as sodium.

In the above-mentioned modified polyvinyl alcohol (A), the group represented by the above formula (I) accounts for 0.01 to 20 mole percent relative to the above-mentioned hydroxyl and acetoxy groups. When it is less than 0.01 mole percent, the improvement in hydrophilicity and odor preventing ability as resulting from the introduction of the group represented by the above formula (I) is not expressed. When it exceeds 20 mole percent, an excessively high level of hydrophilicity results, deteriorating the film-forming ability and facilitating the adsorption of odorants. Preferably, it is 0.1 to 10 mole percent.

The group represented by the above formula (I) may be bound directly to the main chain or via another group, for example an alkylene group such as a methylene or ethylene group, a carbonyl group, an ester group or an amide group.

On the above-mentioned modified polyvinyl alcohol (A), the above hydroxyl group preferably accounts for 50 to 99.9 mole percent relative to the above hydroxyl and acetoxy groups. When it is less than 50 mole percent, an insufficient level of hydrophilicity and/or a poor odor preventing ability may result. When it exceeds 99.9 mole percent, it may become difficult, from the production process viewpoint, to obtain the above polymer. As regards the mole percentage relative to hydroxyl and acetoxy groups in the above modified polyvinyl alcohol (A), it is to be noted that the hydroxyl groups and acetoxy groups do not include those groups contained in the side chains containing the group represented by the above formula (I).

Generally, the above-mentioned modified polyvinyl alcohol (A) can be obtained by saponification of a copolymer produced from monomer components comprising a monomer containing the group represented by the above formula (I) and a vinyl ester-containing monomer.

The degree of saponification of the above-mentioned modified polyvinyl alcohol (A) is preferably not less than 90%, more preferably not less than 95%. When it is less than 90%, poor hydrophilicity may result.

The above monomer containing the group represented by the formula (I) is not particularly restricted but may be any of those having both an unsaturated double bond and a group represented by the above formula (I), for example a product obtained by adding an ethylene oxide to a vinyl group-containing compound such as vinyl alcohol, allyl alcohol, 2-buten-1-ol, 2-buten-2-ol or acrolein. They may be used alone or in combination. The above method of addition is not particularly restricted but, for example, any conventional method can be used. In cases where ethylene oxide is added to a vinyl group-containing aldehyde or ketone, such as acrolein, the corresponding acetal having two groups represented by the above formula (I) bound to one carbon atom is obtained. Saponification product derived from copolymers obtained from monomer components comprising such an acetal also fall within the scope of the modified polyvinyl alcohol (A) to be used in accordance with the present invention.

The above vinyl ester-containing monomer is not particularly restricted. Generally, however, vinyl acetate is suitably used and it may be used in combination with another vinyl ester-containing monomer.

The methods of copolymerization and saponification for obtaining the above-mentioned modified polyvinyl alcohol (A) are not particularly restricted but any conventional method can be used.

The group represented by the above formula (I) may also be introduced after polymer formation.

The above-mentioned modified polyvinyl alcohol (A) may have the other polyoxyalkylene group in addition to the group represented by the above formula (I) In the above-mentioned modified polyvinyl alcohol (A), the other polyoxyalkylene group as mentioned above preferably accounts for not more than 30 mole percent relative to the group represented by the above formula (I). When it exceeds 30 mole percent, the odor preventing ability and hydrophilicity may become inferior. The above-mentioned other polyoxyalkylene group can be introduced, for example by using a monomer having the above-mentioned other polyoxyalkylene group and a vinyl group as a part of the above monomer components followed by copolymerization. The above other polyoxyalkylene group is not particularly restricted but may be a polyoxypropylene group, for instance.

The above-mentioned modified polyvinyl alcohol may have another functional group on a side chain thereof, in addition to the group represented by the above formula (I), hydroxyl groups, ester bonds and the other polyoxyalkylene group which is contained where necessary. The functional group includes, for example, hydrophilic functional groups, for example anionic groups such as carboxyl, sulfonic and phosphonic groups; cationic groups such as amino group and imidazole ring; and nonionic groups such as epoxy group and ether bond. These other functional groups may be introduced directly as side chains by polymerization of a functional group-containing monomer or may be introduced by modification after polymer formation. The above modification is not particularly restricted but includes, for example, epoxy modification, silyl modification, thiol modification, carbonyl modification and, further, anionic modifications such as carboxylic acid modification, and cationic modifications such as amine modification. The above other functional groups may comprise one single species or two or more species.

Preferably, the total amount of the above hydroxyl groups and ester bonds as side chains in the above-mentioned modified polyvinyl alcohol accounts for 80 to 100 mole percent of the total side chain-functional groups in the above-mentioned modified polyvinyl alcohol other than hydrocarbon groups such as methyl and ethyl groups.

The above-mentioned modified polyvinyl alcohol (A) has a number average molecular weight of 1,000 to 1,000,000, preferably 10,000 to 200,000. When it is less than 1,000, the film-forming ability is poor and the hydrophilicity and other physical properties of the coat are also poor. When it exceeds 1,000,000, the resulting modifier for hydrophilicity gives a highly viscous solution, leading to poor workability and poor physical properties of the coat.

The above-mentioned modified polyvinyl alcohol (A) preferably accounts for 0.1 to 30% by mass, more preferably 0.1 to 20% by mass, relative to the above modifier for hydrophilicity. When this is less than 0.1% by mass, a sufficient level of film-forming ability cannot be obtained and the hydrophilicity and odor preventing ability may possibly to be poor. When it exceeds 30% by mass, aggregation tends to occur in the resulting modifier for hydrophilicity, in some cases leading to inferior workability and poor physical properties of the coat.

The above modifier for hydrophilicity may contain, in combination with the above-mentioned modified polyvinyl alcohol (A), a polyvinyl alcohol not containing any group represented by the formula (I). Preferably, the above polyvinyl alcohol not containing any group represented by the formula (I) accounts for 0.1 to 30% by mass relative to the above modifier for hydrophilicity. When the content is less than 0.1% by mass, the occurrence of the above polyvinyl alcohol not containing any group represented by the formula (I) may fail to produce an improvement in odor preventing ability in some cases. When it exceeds 30% by mass, aggregation tends to occur in the resulting modifier for hydrophilicity, in some cases leading to inferior workability and poor physical properties of the coat.

Preferably, the above modifier for hydrophilicity further contains a hydrophilic organic compound other than the above-mentioned modified polyvinyl alcohol (A) or the above-mentioned polyvinyl alcohol not containing any group represented by the formula (I) unless the odor preventing ability is sacrificed. When it contains the above-mentioned other hydrophilic organic compound, the above modifier for hydrophilicity can show further improved hydrophilicity.

The above-mentioned other hydrophilic organic compound has a hydrophilic functional group, and the above hydrophilic functional group includes, for example, hydroxyl, carboxyl, sulfonic, amide, amino and phosphonic groups, an ether bond, an imidazole ring, and a nitrile group. The above ether bond includes an acetal bond. These hydrophilic functional groups may be used singly or in combination. As the above hydrophilic organic compound, there may be mentioned, for example, polyamides such as water-soluble nylon species; polyacrylic acid, polyvinyl sulfonic acid, polystyrenesulfonic acid, polyvinylimidazole, polyvinylpyrrolidone, polyvinylacetamide, polyamines, polyacrylamide, isoprenoid sulfonic acid polymer, polyvinylformamide, polyallylamine, polyethyleneimine, polyamidines, polyglutamic acid, hydoxyethylcellulose, hydroxypropylmethylcellulose, carboxymethylcellulose, polycarbodiimides, water-soluble polyurethanes, water-soluble polyesters, water-soluble phenolic resins, water-soluble epoxy resins and like resins and modifications thereof; chitosan, alginic acid and like hydrophilic low-molecular compounds.

In the above-mentioned other hydrophilic organic compound, the above-mentioned ether bond may be a polyoxyalkylene chain. When the modifier contains a polyoxyalkylene chain-containing other hydrophilic organic compound, the resulting hydrophilic coat can exhibit more improved hydrophilicity while retaining substantially the same level of odor preventing ability as attainable without addition thereof. The polyoxyalkylene chain-containing other hydrophilic organic compound is not particularly restricted but includes, among others, polyethylene oxide, polypropylene oxide, nonionic surfactants, reactive alkylene oxide-based surfactants, ethylene oxide-polypropylene oxide block polymers, ethylene oxide-methylene oxide block polymers, ethylene oxide-derived moiety-containing acrylic resins, ethylene oxide-derived moiety-containing polyester resins, and ethylene oxide-derived moiety-containing polyurethane resins.

When contained in the modifier, the above-mentioned other hydrophilic organic compound preferably accounts for less than 50% by mass relative to the resin solid matter in the above modifier for hydrophilicity. When the content exceeds 50% by mass, an odorant adhering to the above other hydrophilic organic compound may emanate an unpleasant odor and, at the same time, the incorporated proportion of the above-mentioned modified polyvinyl alcohol (A) becomes too low and the modifier as a whole may become inferior in odor preventing ability. A content less than 30% by mass is preferred.

The above modifier for hydrophilicity preferably contains, in combination with the above-mentioned modified polyvinyl alcohol (A), at least one member (B) selected from the group consisting of phosphorus compound salts and boron compound salts of Ca, Al, Mg, Fe and Zn. When it contains the above phosphorus compound salt and/or boron compound salt (B), which is itself does not emanate any odor, the above modifier for hydrophilicity shows an improved odor preventing ability, retains the hydrophilicity, and shows an improved film-forming ability.

The phosphorus compound salt mentioned above is not particularly restricted but preferably is a salt of an acid constituted of a phosphorus atom(s) and oxygen atoms, such as an oxo acid of phosphorus, including, for example, phosphoric acid salts, phosphorous (phosphonic) acid salts, hypophosphorous (phosphinic) acid salts, phytic acid salts, and condensed phosphoric acid salts. The above condensed phosphoric acid salts are not particularly restricted but include, for example, metaphosphoric acid salts; and salts of polyphosphoric acids such as pyrophosphoric acid and tri-polyphosphoric acid. The above-mentioned phosphorus compound salt is preferably one hardly soluble in water, more preferably one having solubility in water (20° C.) of not more than 1.0 g/100 cm$^3$.

The above-mentioned boron compound salt is not particularly restricted but includes, for example, boric acid salts and borofluorate salts.

The above phosphorus compound salt and boron compound salt preferably have a mean particle diameter of 0.01 to 5 $\mu$m.

The above phosphorus compound salt and/or boron compound salt (B) preferably accounts for 0.1 to 200% by mass, preferably 5% to 50% by mass, relative to the resin solid matter in the above modifier for hydrophilicity. When it is less than 0.1% by mass, the odor preventing ability and film-forming ability may not be enhanced by the addition of the above phosphorus compound salt and/or boron compound salt (B). When it exceeds 200% by mass, the phosphorus compound salt and/or boron compound salt (B) itself may emanate an odor or physical properties of the coat may possibly deteriorate.

Preferably, the above modifier for hydrophilicity further contains at least one member selected from the group consisting of inorganic crosslinking agents, organic crosslinking agents and coupling agents. When it contains the above crosslinking agent and/or coupling agent, the above modifier for hydrophilicity can give hydrophilic coats resistant to deterioration, for example erosion, even when they are exposed to water drops or running water; thus, the hydrophilicity and/or film-forming ability can be further improved.

The above inorganic crosslinking agent is not particularly restricted. Preferred are, however, metal compounds capable of forming complexes with the above-mentioned modified polyvinyl alcohol (A), for example metal compounds containing zirconium, titanium, chromium, aluminum or zinc. Silica may also be used as the above inorganic crosslinking agent. The above silica is not particularly restricted but includes, for example, ammonium silicate, colloidal silica, silica anhydride, and the like. The mean particle diameter of the above silica is preferably not more than 50 nm. When the above silica is contained, odor preventing ability can also be improved.

The organic crosslinking agent or coupling agent mentioned above is not particularly restricted but includes those having a functional group capable of reacting with the hydroxyl group or with the modified functional group, for example blocked isocyanates, phenolic resins, melamine, silane coupling agents, titanium coupling agents, epoxy compounds, carbodiimides, thiol compounds, silane compounds, amino resins, carboxylic acids and anhydrides thereof, amines, aziridine compounds and like organic compounds.

The above inorganic crosslinking agent, organic crosslinking agent and/or coupling agent preferably accounts for 0.01 to 100% by mass relative to the resin solid matter in the above modifier for hydrophilicity. When it is less than 0.01% by mass, the hydrophilicity or film-forming ability may not be enhanced by the addition of such crosslinking agent and/or coupling agent. When it exceeds 100% by mass, the odor of such crosslinking agent and/or coupling agent itself may become significant, or may adsorb odorants to emanate an unpleasant odor, or may impair the hydrophilicity.

In cases where the silica is contained as the above inorganic crosslinking agent, the above silica is preferably 0.1 to 100% by mass, more preferably 5 to 30% by mass relative to the resin solids in the above modifier for hydrophilicity. If it is less than 0.1% by mass, odor preventing ability or film forming ability due to the above silica may not be obtained, while it exceeding 100% by mass, silica itself may have odor and physical properties of the coat may be deteriorated.

The modifier for hydrophilicity of the invention may further contain particles having a mean particle diameter of 0.01 to 5 $\mu$m. In the present specification, the above-mentioned particles having a mean particle diameter of 0.01 to 5 $\mu$m are other than the above-mentioned other hydrophilic organic compound, phosphorus compound salts and/or boron compound salts (B), crosslinking agents and coupling agents. When it contains the above particles, the above modifier for hydrophilicity can make uneven the surface of the coat obtained upon treatment with the above modifier for hydrophilicity and can improve the hydrophilicity through this unevenness.

The above particles may be of an organic compound or an inorganic compound. As the organic compound, there may be mentioned, for example, acrylic, silicone, melamine and cellulosic polymers in minute particle form; titanium oxide, aluminum oxide, zirconium oxide, glass beads and silica may be mentioned as example of the inorganic compound.

When a mean particle diameter of the above particle is smaller than 0.01 $\mu$m, it is difficult to obtain an uneven surface profile sufficient to improve the hydrophilicity of the hydrophilic coat surface. When it exceeds 5 $\mu$m, the unevenness of the above coat surface becomes excessive, so that retention of condensate water may occur on the coat surface or the coat may become poor in appearance in some cases. A mean particle diameter of 0.1 to 2 $\mu$m is preferred.

The above particles preferably account for less than 50% by mass relative to the resin solid matter in the above modifier for hydrophilicity. When it is not less than 50% by mass, the above particles themselves may emanate an odor and/or an odorant(s) adsorbed thereon may emanate an unpleasant odor. Preferably, it is lower than 30% by mass.

The above modifier for hydrophilicity may further contain a dispersant so that the above-mentioned modified polyvinyl alcohol (A) may be dispersed uniformly. The above dispersant is not particularly restricted but includes, for example, high-molecular polycarboxylic acid alkylolamine salts, acrylic copolymers, polycarboxylic acid amide solutions, aliphatic polybasic carboxylic acids, and high-molecular acid polyester salts. Various surfactants may also be added for attaining dispersion.

Any of various antimicrobial agents may be added to the above modifier for hydrophilicity.

Usable as the above antimicrobial agents are, for example, zinc pyrithione, 2-(4-thiazolyl)-benzimidazole, 1,2-benzisothiazoline, 2-n-octyl-4-isothiazolin-3-one, N-(fluorodichloromethylthio)phthalimide, N,N-dimethyl-N'-phenyl-N'-(fluorodichloromethylthio)sulfamide, methyl 2-benzimidazolecarbamate, bis(dimethylthiocarbamoyl) disulfide, N-(trichloromethylthio)-4-cyclohexane-1,2-dicarboximide, barium metaborate, allyl isothiocyanate; polyoxyalkylenetrialkylammonium salts, organosilicon quaternary ammonium salts, hexamethylenebiguanide hydrochloride, and like quaternary ammonium salts; tri-n-butylteradecylphosphonium chloride and like quaternary phosphonium salts; polyphenolic antimicrobial agents, phenylamide antimicrobial agents, and biguanide antimicrobial agents.

Various additives other than those mentioned above may be incorporated in the above modifier for hydrophilicity according to need. As the above additives, there may be mentioned lubricants, antimicrobial agents, antifungal agents, preservatives, antibacterial agents, surfactants, pigments, dyes, and inhibitors for providing corrosion resistance, etc.

The above modifier for hydrophilicity can be prepared in the conventional manner. For example, there can be used the method which comprises effecting dissolution or dispersion of the above-mentioned modified polyvinyl alcohol (A), if desired together with the polyvinyl alcohol not containing the group represented by the above formula (I), and/or the other hydrophilic organic compound, in the whole modifier, adding the optional component(s), such as the phosphorus compound salt and/or boron compound salt (B), particles having a mean particle diameter of 0.01 to 5 $\mu$m, crosslinking agent, coupling agent, and other additives, and, if necessary, performing forced dispersion using an ultrasonic dispersion mixer, a dispersion mixer using a micro medium or the like.

The hydrophilic modification method using the above modifier for hydrophilicity is not particularly restricted but includes, for example, the dipping method and coating method. Since the above heat exchanger generally has a complicated profile, the dipping method is preferred. When the dipping method is employed in the above hydrophilic modification, the treatment liquid temperature is preferably about 10 to 60° C., and the treatment time is preferably about 3 seconds to about 5 minutes. A coat having a solid coat amount of 0.02 to 3 g/m$^2$ is formed by the above hydrophilic modification. When it is less than 0.02 g/m$^2$, the hydrophilic properties will not be produced. When it exceeds 3 g/m$^2$, the productivity will decrease. It is preferably 0.05 to 3 g/m$^2$, more preferably 0.1 to 1 g/m$^2$.

After the above hydrophilic modification, baking is carried out at 100 to 220° C. for 10 to 60 minutes, whereby a hydrophilic coat can be obtained. At a baking temperature below 100° C., unsatisfactory film-forming ability may result and, at above 220° C., the durability of hydrophilicity will decrease. The baking temperature is preferably 120 to 200° C.

As mentioned above, the hydrophilic modification method of the present invention uses a modifier for hydrophilicity which comprises a modified polyvinyl alcohol (A) containing 0.01 to 20 mole percent of a group represented by the above formula (I), relative to the hydroxyl and acetoxy groups in the molecule, and as a consequence, the hydrophilic coat obtained from the above modifier for hydrophilicity shows very good hydrophilicity and, in addition, as the intrinsic properties of the coat, not only emanation of a dusty or like unpleasant odor but also emanation of the unpleasant odor of the odorant after exposure thereto, are attenuated. The mechanisms by which the hydrophilic modification method of the present invention produces such advantageous effects are not fully clear but may be as follows.

Thus, the above-mentioned modified polyvinyl alcohol (A) shows a high level of hydrophilicity owing to the hydroxyl groups and groups represented by the above formula (I) contained therein, whereas it is low in affinity for odorants, high in crystallinity and high in density, so that even if an odorant is adhered to the oxygen atoms of the hydroxyl groups or of the groups represented by the above formula (I), it is presumably not accumulated but is released, hence the unpleasant odor of the above odorant will not be emanated. Therefore, the hydrophilic modification method of the present invention is suitably applied to heat exchangers.

The hydrophilic modification method of the present invention and the heat exchanger as treated by the above hydrophilic modification method, which have the respective constitutions mentioned above, will not emanate the dusty odor which is intrinsic in some component(s) in the modifier for hydrophilicity or the unpleasant odor of an odorant(s) adsorbed thereon. Thus, even during a long period of use, the odor of the hydrophilic coat itself as obtained can be suppressed and unpleasant odor emanation after exposure to odorants can be suppressed, while the hydrophilicity can be retained.

EXAMPLES

The following Examples and Comparative Examples further illustrate the present invention. These Examples are, however, by no means limitative of the scope of the present invention. In each table, each concentration data indicates the concentration (in % by mass) in the modifier for hydrophilicity.

Examples 1 to 21
(Preparation of Modifiers for Hydrophilicity)

According to the formulations shown in Table 1, modifiers for hydrophilicity having the respective concentrations (% by mass) given in Table 1 were prepared by blending a modified polyvinyl alcohol powder, a phosphorous compound salt, boron compound salt, hydrophilic organic compound, a crosslinking agent and so forth. Used as the polyvinyl alcohol not having any group relative to the above formula (I) was PVA-1 [degree of saponification 99%; number average molecular weight 50,000]. Used as the modified polyvinyl alcohol were PVA-2, PVA-3 and PVA-4 [n in the above formula (I) being 10, 10 and 20, respectively; the group represented by the above formula (I) accounting for 5 mole percent, 1 mole percent and 1 mole percent, respectively, relative to the hydroxyl and acetoxy groups in the molecule; the degree of saponification being 99% and the number average molecular weight being 50,000 in each case]. Used as a carboxylic acid-modified polyvinyl alcohol was PVA-5 [with 5 moles relative to 100 moles of the sum of the hydroxyl and acetoxy groups in the molecule being modified with acrylic acid; n in the above formula (I) being 10; the group represented by the above formula (I) accounting for 5 mole percent relative to the hydroxyl and acetoxy groups in the molecule; the degree of saponification being 99%; the number average molecular weight being 50,000]. Furthermore, a dispersant [polycarboxylic acid amide solution], a crosslinking phenol [novolak phenol resin, number average molecular weight about 1,000], a polyisocyanate [self-emulsifiable aqueous blocked isocyanate], an acrylic resin [copolymer of methoxypolyoxyethylene methacrylate and acrylic acid (8:2)], polyethylene oxide [PEO, number average molecular weight 100,000], polyacrylamide [homopolymer, number average molecular weight 20,000], resin particles [methyl methacrylate resin particles, mean particle diameter 1 μm], an antimicrobial agent [2-(4-thiazolyl)benzimidazole], silica anhydrous [particle diameter 10 nm] and so forth were used.

(Hydrophilic Modification)

An aluminum alloy-made heat exchanger was immersed in a bath containing an acidic cleaning solution containing 10% by mass (1.6 N) of nitric acid and 5% by mass (1.0 N) of sulfuric acid [indicated as ① in the column "Pretreatment", of Tables 1 and 3] and warmed to 65° C. for 4 minutes, then drawn up, and thoroughly washed with tap water. Further, this heat exchanger was immersed in a bath containing a zirconium-containing rust preventing agent (Alsurf 440N, 2%, product of Nippon Paint, indicated as ① in the column "Chemical conversion", of Tables 1 and 3) warmed to 50° C. for 90 seconds for chemical conversion treatment, and then thoroughly washed with tap water. Then, this heat exchanger was immersed in a bath containing one of the modifiers for hydrophilicity obtained in the above manner at 20° C. for 1 minute, then drawn up, and heated to 140° C. (temperature arrived at) for 30 minutes to give a hydrophilic modification product with a solid coat amount of 0.3 g/m².

In Example 19, an acidic cleaning agent [Surfcleaner 322N8, product of Nippon Paint; indicated as ② in the column "Pretreatment", of Table 1] was used in lieu of 10% by mass of nitric acid and 5% by mass of sulfuric acid and, in Example 20, a chromate-phosphate rust preventing agent [Alsurf 407/47, 3%/0.5%, product of Nippon Paint; indicated as ② in the column "Chemical conversion", of Table 1] was used in lieu of Alsurf 440N.

(Evaluation)

The hydrophilic modification products obtained in the above manner were evaluated for hydrophilicity and odor by the following methods. The results are shown in Table 2.

1. Hydrophilicity Evaluation

Hydrophilic modification products were brought into contact with running tap water for 72 hours and then measured for contact angle with water drops. A smaller contact angle can be said to be indicative of a higher level of hydrophilicity.

2. Dusty Odor Evaluation

Hydrophilic modification products were brought into contact with running tap water for 72 hours and then smelled for evaluation on the following scoring scale:

| | |
|---|---|
| 0 point | No odor; |
| 1 point | An odor is smelled just faintly; |
| 2 points | An odor is smelled rather readily; |
| 3 points | An odor is smelled clearly; |
| 4 points | A strong odor is smelled; |
| 5 points | A very strong odor is smelled. |

3. Adhering Odor (1)

The hydrophilic modification product was brought into contact with running tap water for 72 hours and then placed in a meeting room (50 m³) where the product was exposed to the smoke from 20 cigarettes for 3 hours. Then, it was allowed to stand in another smoke-free meeting room (50 m³) for 1 hour and, thereafter, subjected to sensory evaluation on the scale of 0 to 5 as mentioned above under 3.

4. Adhering Odor (2)

The hydrophilic modification product was brought into contact with running tap water for 72 hours and then placed in a meeting room (50 m³) where the product was exposed to the odor from 100 ml each of four commercially available perfumes, namely CKone (Calvin Klein), Ptisenbon (Givenchy), True Love (Elizabeth Arden) and Tendre Poison (Christian Dior). Then, it was allowed to stand in another odor-free meeting room (50 m³) for 1 hour, and subjected to sensory evaluation on the scale of 0 to 5 as mentioned above under 3.

TABLE 1

| Example | Pretreatment | Chemical conversion | PVA | Modifier for hydrophilicity (concentration in a modifier for hydrophilicity; % by mass) | | |
|---|---|---|---|---|---|---|
| | | | | Metal compound | Crosslinking agent | Additive |
| 1 | ① | ① | PVA-2(2.0) | Ca phosphate(0.5) | — | — |
| 2 | ① | ① | PVA-3(2.0) | Ca phosphate(0.5) | — | — |
| 3 | ① | ① | PVA-4(2.9) | Ca phosphate(0.5) | — | — |
| 4 | ① | ① | PVA-1(1.0) PVA-2(1.0) | Ca phosphate(0.5) | — | — |
| 5 | ① | ① | PVA-2(2.0) | Fe phosphate(0.5) | — | — |
| 6 | ① | ① | PVA-2(2.0) | Al tripolyphosphate | — | — |
| 7 | ① | ① | PVA-2(2.0) | Mg borate | — | — |
| 8 | ① | ① | PVA-2(2.0) | Zinc pyrophosphate | — | — |
| 9 | ① | ① | PVA-2(2.0) | Ca phosphate(0.5) Dispersant(0.2) | — | — |
| 10 | ① | ① | PVA-2(2.0) | Ca phosphate(0.5) | Crosslinking phenol(0.2) | — |
| 11 | ① | ① | PVA-5(2.0) | Ca phosphate(0.5) | Silane coupling agent(0.2) | — |
| 12 | ① | ① | PVA-1(1.0) PVA-2(1.0) | Ca phosphate(0.5) | Polyisocyanate(0.2) | — |
| 13 | ① | ① | PVA-2(2.0) | Ca phosphate(0.5) | — | Acrylic resin(0.5) |
| 14 | ① | ① | PVA-2(2.0) | Ca phosphate(0.5) | — | PEO(0.5) |
| 15 | ① | ① | PVA-2(2.0) | Ca phosphate(0.5) | — | Polyacrylamide(0.5) |
| 16 | ① | ① | PVA-2(2.0) | Ca phosphate(0.5) | — | Na polyvinylsulfonate(0.5) |
| 17 | ① | ① | PVA-2(2.0) | Ca phosphate(0.5) | — | Resin particles(0.5) |
| 18 | ① | ① | PVA-2(2.0) | Ca phosphate(0.5) | — | Antimicrobial agent(0.2) |
| 19 | ① | ① | PVA-2(2.0) | Ca phosphate(0.5) | — | — |
| 20 | ① | ① | PVA-2(2.0) | Ca phosphate(0.5) | — | — |
| 21 | ① | ① | PVA-1(1.0) PVA-2(1.0) | Ca phosphate(0.5) | Silica(0.2) | — |

TABLE 2

| Example | Hydrophilicity 1 | Odor | | |
|---|---|---|---|---|
| | | Dusty odor 1 | Adhering odor 1 | Adhering odor 2 |
| 1 | 28 | 1.5 | 1.8 | 1.8 |
| 2 | 25 | 1.5 | 1.8 | 1.8 |
| 3 | 28 | 1.5 | 1.8 | 1.8 |
| 4 | 25 | 1.5 | 1.8 | 1.8 |
| 5 | 25 | 1.5 | 1.8 | 2 |
| 6 | 25 | 1.5 | 1.8 | 1.8 |
| 7 | 25 | 1.5 | 1.8 | 1.8 |
| 8 | 25 | 1.5 | 1.8 | 1.8 |
| 9 | 23 | 1.5 | 1.8 | 1.8 |
| 10 | 28 | 1 | 1.8 | 1.8 |
| 11 | 25 | 1.5 | 2 | 2 |
| 12 | 25 | 1 | 1.8 | 1.8 |
| 13 | 20 | 1 | 1.8 | 1.8 |
| 14 | 23 | 1.5 | 1.8 | 2 |
| 15 | 23 | 1.5 | 2 | 2 |
| 16 | 23 | 1.5 | 2 | 2 |
| 17 | 25 | 1.5 | 1.8 | 2 |
| 18 | 25 | 1.5 | 1.8 | 1.8 |
| 19 | 28 | 1.5 | 1.8 | 1.8 |
| 20 | 28 | 1.5 | 1.8 | 1.8 |
| 21 | 28 | 1 | 1.8 | 1.8 |

Comparative Examples 1 to 6

Using modifiers for hydrophilicity respectively having the compositions shown in Table 3, hydrophilic modification products were obtained and evaluated in the same manner as in Example 1 except that the acid cleaning as pretreatment was omitted in Comparative Example 1 and that no chemical conversion treatment was carried out in Comparative Example 2. Used in the modifiers for hydrophilicity were polyacrylic acid (homopolymer, number average molecular weight 100,000), colloidal silica [aqueous dispersion of $SiO_2$, mean particle diameter 0.3 μm], carboxymethylcellulose [number average molecular weight 20,000], polyvinylsulfonic acid [homopolymer, number average molecular weight 20,000], polyacrylamide [homopolymer, number average molecular weight 20,000], polyvinylpyrrolidone [homopolymer, number average molecular weight 20,000], polyethylene oxide [PEO, number average molecular weight 100,000], and the above-mentioned PVA-2. The evaluation results are shown in Table 3.

TABLE 3

| Compar Ex. | Pretreatment | Chemical conversion | Modifier for hydrophilicity (concentration in modifier for hydrophilicity; % by mass) | Hydrophilicity 1 | Odor | | |
|---|---|---|---|---|---|---|---|
| | | | | | Dusty odor 1 | Adhering odor 1 | Adhering odor 2 |
| 1 | No | ① | PVA-2(2.0) Ca phosphate(0.5) | 40 | 2.5 | 3 | 2.5 |
| 2 | ① | No | PVA-2(2.0) Ca phosphate(0.5) | 42 | 2.5 | 3 | 2.5 |
| 3 | ① | ① | Polyacrylic acid(1.0) Colloidal silica(2.0) | 25 | 3 | 3 | 3 |
| 4 | ① | ① | Carboxymethylcellulose(1.0) Polyacrylic acid(1.0) Zircon antimony fluoride(0.2) | 25 | 2 | 3 | 2.5 |
| 5 | ① | ① | Polyvinylsulfonic acid(1.0) Polyacrylamide(1.0) Zircon antimony fluoride(0.2) | 20 | 1.5 | 3 | 2.5 |

TABLE 3-continued

| Compar Ex. | Pretreatment | Chemical conversion | Modifier for hydrophilicity (concentration in modifier for hydrophilicity; % by mass) | Hydrophilicity 1 | Odor Dusty odor 1 | Adhering odor 1 | Adhering odor 2 |
|---|---|---|---|---|---|---|---|
| 6 | ① | ① | Polyvinylpyrrolidone(1.0) PEO(1.0) Polyacrylic acid(1.0) Ca phosphate(0.2) | 25 | 1.5 | 2.5 | 3 |

From Tables 1 to 3, it was clear that while the hydrophilic modification products obtained in Comparative Examples which were outside the scope of the present invention were poor in hydrophilicity and/or odor preventing ability, the hydrophilic modification products obtained in Examples within the scope of the present invention were superior in hydrophilicity and odor preventing ability.

What is claimed is:

1. A hydrophilic modification method comprising
a step of forming a coat having a solid coat amount of 0.02 to 3 g/m² on a heat exchanger with a modifier for hydrophilicity after treatment for rust prevention thereof
wherein said modifier for hydrophilicity comprises a modified polyvinyl alcohol (A) having, on a side chain thereof, a group represented by the formula (I):

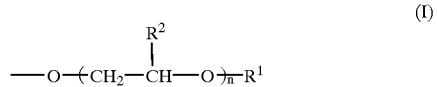

in the formula, n represents an integer of 1 to 500, $R^1$ represents a hydrogen atom or an alkyl group containing 1 to 4 carbon atoms, and $R^2$ represents a hydrogen atom or a methyl group,
and at least one member (B) selected from the group consisting of phosphorus compound salts and boron compound salts of Ca, Al, Mg, Fe and Zn,
said group represented by the formula (I) accounting for 0.01 to 20 mole percent relative to hydroxyl and acetoxy groups contained in said modified polyvinyl alcohol.

2. The hydrophilic modification method according to claim 1,
wherein the modifier for hydrophilicity contains 0.1 to 30% by mass, relative to said modifier for hydrophilicity, of a polyvinyl alcohol having a degree of saponification of not less than 90%.

3. The hydrophilic modification method according to claim 1,
wherein the modified polyvinyl alcohol (A) accounts for 0.1 to 30% by mass relative to the modifier for hydrophilicity.

4. The hydrophilic modification method according to claim 1,
wherein at least one member (B) selected from the group consisting of phosphorus compound salts and boron compound salts of Ca, Al, Mg, Fe and Zn accounts for 0.1 to 200% by mass relative to a resin solid matter.

5. The hydrophilic modification method according to claim 1,
wherein the heat exchanger is made of an aluminum or aluminum alloy material.

6. A heat exchanger treated by the hydrophilic modification method according to claim 1.

7. The hydrophilic modification method according to claim 2,
wherein the modified polyvinyl alcohol (A) accounts for 0.1 to 30% by mass relative to the modifier for hydrophilicity.

8. The hydrophilic modification method according to claim 2,
wherein at least one member (B) selected from the group consisting of phosphorus compound salts and boron compound salts of Ca, Al, Mg, Fe and Zn accounts for 0.1 to 200% by mass relative to a resin solid matter.

9. The hydrophilic modification method according to claim 3,
wherein at least one member (B) selected from the group consisting of phosphorus compound salts and boron compound salts of Ca, Al, Mg, Fe and Zn accounts for 0.1 to 200% by mass relative to a resin solid matter.

10. The hydrophilic modification method according to claim 2,
wherein the heat exchanger is made of an aluminum or aluminum alloy material.

11. The hydrophilic modification method according to claim 3,
wherein the heat exchanger is made of an aluminum or aluminum alloy material.

12. The hydrophilic modification method according to claim 4,
wherein the heat exchanger is made of an aluminum or aluminum alloy material.

13. A heat exchanger treated by the hydrophilic modification method according to claim 2.

14. A heat exchanger treated by the hydrophilic modification method according to claim 3.

15. A heat exchanger treated by the hydrophilic modification method according to claim 4.

16. A heat exchanger treated by the hydrophilic modification method according to claim 5.

* * * * *